(12) United States Patent
Chen

(10) Patent No.: US 9,744,602 B2
(45) Date of Patent: Aug. 29, 2017

(54) WORK PIECE CHUCK OF A MANIPULATOR

(71) Applicant: Qiyue Chen, Taizhou (CN)

(72) Inventor: Qiyue Chen, Taizhou (CN)

(73) Assignee: Wuhu Huiying Automatic Equipment Co., Ltd., Wuhu (CN)

( * ) Notice: Subject to any disclaimer, the term of this patent is extended or adjusted under 35 U.S.C. 154(b) by 264 days.

(21) Appl. No.: 14/318,710

(22) Filed: Jun. 30, 2014

(65) Prior Publication Data
US 2015/0014908 A1 Jan. 15, 2015

(30) Foreign Application Priority Data

Jul. 5, 2013 (CN) .......................... 2013 1 0283431

(51) Int. Cl.

| | |
|---|---|
| *B23Q 3/00* | (2006.01) |
| *B23B 31/40* | (2006.01) |
| *B25J 15/00* | (2006.01) |
| *B25J 15/12* | (2006.01) |
| *B23B 31/00* | (2006.01) |
| *B23C 3/14* | (2006.01) |

(52) U.S. Cl.
CPC ........ *B23B 31/4006* (2013.01); *B23B 31/001* (2013.01); *B23C 3/14* (2013.01); *B25J 15/0038* (2013.01); *B25J 15/0047* (2013.01); *B25J 15/12* (2013.01); *Y10T 279/1008* (2015.01)

(58) Field of Classification Search
CPC ... B23Q 1/25; B23Q 1/70; B23Q 3/06; B23Q 3/067; B23Q 3/068; B23B 31/001; B23B 31/20

USPC ........ 269/309–310, 48.1, 48, 48.2; 279/2.07, 279/2.12, 2.02, 2.03, 2.1, 157, 20
See application file for complete search history.

(56) References Cited

U.S. PATENT DOCUMENTS

| | | | | |
|---|---|---|---|---|
| 403,529 | A * | 5/1889 | Gay ................... | B23B 31/4033 279/2.03 |
| 1,133,374 | A * | 3/1915 | Gamble .............. | B23B 31/4046 279/2.12 |
| 1,427,155 | A * | 8/1922 | Haven .................... | B23B 31/06 269/7 |
| 1,864,466 | A * | 6/1932 | Peterson ............. | B25B 23/0035 279/2.12 |

(Continued)

FOREIGN PATENT DOCUMENTS

CN 202517354 U 11/2012

*Primary Examiner* — Joseph J Hail
*Assistant Examiner* — J Stephen Taylor
(74) *Attorney, Agent, or Firm* — Minder Law Group; Willy H. Wong

(57) ABSTRACT

The present invention provides a work piece chuck of manipulator in the field of mechanical technology. The chuck comprises a chuck sleeve and an ejector pin set within the chuck sleeve. An elastic clamping element is provided at the front end of the chuck sleeve. The ejector pin could move between a first position and a second position along the axial direction of the chuck sleeve. When the ejector pin is in the first position, the outer circumference of the ejector pin extrudes the clamping element to distort and expand outward to form an expansion state. When the ejector pin is in the second position, the outer circumference of the ejector pin is out of contact with the clamping element to restore the clamping element. The chuck has a number of advantages including firm connection, high reliability and high use value.

10 Claims, 3 Drawing Sheets

(56) References Cited

U.S. PATENT DOCUMENTS

| | | | | |
|---|---|---|---|---|
| 2,360,968 | A * | 10/1944 | Mundy | B23B 31/4006 |
| | | | | 279/2.03 |
| 2,656,190 | A * | 10/1953 | Towle | B24B 45/006 |
| | | | | 279/2.03 |
| 2,911,890 | A * | 11/1959 | Miller | B31B 1/60 |
| | | | | 279/2.03 |
| 3,517,939 | A * | 6/1970 | Jaehn | B23B 31/4033 |
| | | | | 279/2.03 |
| 6,527,266 | B1 * | 3/2003 | Yonezawa | B23Q 1/0081 |
| | | | | 269/309 |
| 2012/0319340 | A1 * | 12/2012 | Kawakami | B23Q 1/009 |
| | | | | 269/48.3 |

* cited by examiner

WORK PIECE CHUCK OF A MANIPULATOR

BACKGROUND OF THE INVENTION

Field of Invention

The present invention pertains to the field of mechanical technology. The invention relates to a work piece chuck of a manipulator, and particularly, to a chuck of a manipulator for a water faucet.

Related Art

In the manufacturing industry, in order to guarantee the quality and aesthetic appearance of the products, sanding for components to be cast and finishing for components to be processed are important processes for molding of components. Some problems may exist in the casting shape and machining size for components of complex appearance, particularly water faucets for bathroom, including deviation, variation on wall thickness and inconsistency in shapes and positions, for which the components could not be processed by special machine tools. Therefore, ordinary finishing is done by using man power on abrasive belt machine and cloth wheel machine. As heat will be generated by finishing and friction and a large amount of metallic dust will be produced in the process of finishing, such working conditions are harmful to humans. Moreover, thanks to unreliability of manual operation, the finishing depth can not be easily and precisely determined. Consequently, low operation efficiency is resulted and the uniformity and reliability of finishing products could not be sufficiently guaranteed.

As a result of the unreliability in manual polishing and hazards to human health, automatic polishing is generally employed at present. That is to say, after the work piece is caught by the manipulator arm, the work piece can be polished and finished on the polisher according to a preset path, which provides a high polishing efficiency and reduces the labor intensity of the workers. When an ordinary manipulator arm is used to clamp the work piece, the chuck at the front end of the manipulator arm will extend into the work piece, and several claws at the front end of the chuck are pressed circumferentially against the inner side wall of the work piece. The work piece is caught by using the force exerted by the claws against the inner side wall of the work piece. As the chuck exerts a force against the inner side wall of the work piece through the claws and no specific positioning mechanism is used, each of the claws at the front end of the chuck cannot be guaranteed to be on the same plane, which tends to influence the uniformity of finishing of the work piece surface and impair the reliability of connection of the chuck with the work piece.

SUMMARY OF THE INVENTION

In order to address the aforesaid problems existing in the prior art, the present invention provides a work piece chuck of a manipulator which could be used to more conveniently hold the work piece and connected with the work piece in a firmer manner.

It is one object of the present invention to provide a work piece chuck of a manipulator. The chuck comprises a chuck sleeve and an ejector pin set within the chuck sleeve. An elastic clamping element is provided at the front end of the chuck sleeve. The ejector pin could move between a first position and a second position along the axial direction of the chuck sleeve. When the ejector pin is in the first position, the outer circumference of the ejector pin extrudes the clamping element to distort and expand outward to form an expansion state. When the ejector pin is in the second position, the outer circumference of the ejector pin is out of contact with the clamping element to restore the clamping element.

In the work piece chuck of a manipulator of the invention, there are several clamping elements arranged into an annular port which is formed by several indentations opened at the front end of the chuck sleeve along the axial direction of the chuck sleeve. Such a configuration easily forms the expansion structure.

In the work piece chuck of a manipulator of the invention, an engagement part is provided at the end of the outer circumference of the clamping element and projects from the outer circumference of the clamping element. The engagement part could reduce the moving distance of the elastic piece.

In the work piece chuck of a manipulator of the invention, the ejector pin and the chuck sleeve are circumferentially fixed, the inner end of the ejector pin is connected with a power element, and the outer end of the ejector pin extends out of or retracts into the front end of the chuck sleeve under the action of the power element.

When the work piece chuck of a manipulator of the invention is used to hold the work piece, the chuck extends into the work piece and the outer end of the ejector pin extends out of the front end of the chuck sleeve under the action of the power element. As several indentations are opened at the front ends of the chuck sleeve along the axial direction, the front tend of the chuck sleeve is elastic. When the front end of the ejector pin extends out, it extrudes the front end of the chuck sleeve outward, and front end of the chuck sleeve expands outward. The front end of the chuck sleeve gradually expands to attach to the inner side wall of the work piece as the ejector pin continuously extends out. In the meantime, the engagement part at the outer side of the front end of the chuck sleeve will be engaged with the inner side wall of the work piece. As a result, the chuck is firmly held by the chuck.

In the work piece chuck of a manipulator of the invention, the front end of the chuck sleeve is conical. The conical shape of the front end of the chuck sleeve adapts the chuck sleeve to work pieces of different diameters including pipes, water faucets and valves. When the ejector pin is driven by the power element to move forward, the front end of the ejector pin will extrude the front end of the chuck sleeve outward, for which the front end of the chuck sleeve will expand outward.

In the work piece chuck of a manipulator of the invention, the front end of the ejector pin is also conical, and the taper angle of the front end of the ejector pin is larger than that of the front end of the chuck sleeve. The outer end of the ejector pin is driven by the power element to move outward relative to the front end of the chuck sleeve. As the taper angle of the outer end of the ejector pin is larger than that of the front end of the chuck sleeve, the front end of the chuck sleeve will be extruded outward to expand when the outer end of the ejector pin extends outwards. In the work piece chuck of a manipulator of the invention, the engagement part forms an annular shoulder on the outer circumference of the front end of the chuck sleeve.

When the front end of the chuck sleeve is extruded by the outer end of the ejector pin to expand outward, the annular shoulder on the outer side of the front end of the chuck sleeve will expand outward as well and be finally engaged with the inner side wall of the work piece. Particularly, when the work piece is a water faucet, the annular shoulder at the front end of the chuck sleeve will be pressed against the bottom of the threaded part on the inner side wall of the water faucet.

In the work piece chuck of a manipulator of the invention, positioning protrusions are provided at the front end of the ejector pin. When the ejector pin extends into the work piece, the positioning protrusions will cooperate with the inner bores of the work piece to ensure that the work piece will not rotate relative to the chuck.

In the work piece chuck of a manipulator of the invention, three positioning protrusions are provided. When the work piece is a water faucet, the said three positioning protrusions at the outer end of the ejector pin are exactly in cooperation with three water passage holes on the valve core of the water faucet.

In the work piece chuck of a manipulator of the invention, a position limiter is disposed on the central side of the ejector pin and a position limiting groove is correspondingly disposed on the central side of the chuck sleeve. The position limiter is located within the position limiting groove. The width of the position limiter is identical to the width of the position limiting groove and the length of the position limiting groove is larger than that of the position limiter.

As the width of the position limiter is identical to that of the position limiting groove, the ejector pin cannot rotate relative to the chuck sleeve in the circumferential direction. Moreover, the length of the position limiting groove is larger than that of the position limiter, so that the axial movement of the ejector pin in the axial direction will not be restricted.

In the work piece chuck of a manipulator of the invention, the positioning protrusion (5) is provided with a perforative air outlet. The inner cavity of the ejector pin is hollow and in communication with the air outlet. An air exiting means is provided on the ejector pin for blowing air into the work piece through the air outlet.

A large amount of residuals are left within the work piece when the work piece is processed at the processing center. When the work piece is to be held by the manipulator for polishing and finishing, air is provided into the work piece via the air outlet on the ejector pin in communication with the inner cavity, and the residuals within the work piece could be blown away. That is to say, the work piece can be polished and finished while the residuals can be cleared in the meantime In the work piece chuck of a manipulator of the invention, the air exiting means includes an air inlet opened on the position limiter and an air hole opened on the inner side wall of the ejector pin corresponding to the air inlet on the position limiter The air inlet on the position limiter is in communication with one air supply in such a manner that the air supply provides air to the inner cavity of the ejector pin via the air hole and finally blows air into the work piece via the air outlet on the positioning protrusion. Consequently, the air exiting from the air outlet on the positioning protrusion can blow the iron residuals within the work piece away.

In the work piece chuck of a manipulator of the invention, two annular seal grooves are opened on the side of the ejector pin and an annular seal ring is provided between the annular seal groove and the inner side wall of the chuck sleeve. An annular groove is further formed between two annular seal grooves on the side of the ejector pin. The air exiting means includes an air hole which is provided at the annular groove and in communication with the inner cavity of the ejector pin and an air inlet which is disposed on the side of the chuck sleeve and in communication with the air hole. The air inlet is always located between two annular seal grooves when the ejector pin moves relative to the chuck sleeve in the axial direction.

An air supply is connected with the air inlet on the side of the chuck sleeve. While the ejector pin is moved, the air enters into the inner cavity of the ejector pin from the air supply through the air inlet and the air hole, and eventually enters into the work piece via the air outlets of the positioning protrusions for cleaning. As the air inlet is always located between two annular seal grooves on the side of the ejector pin when the ejector pin moves, the air will not leak from the spacing between the ejector pin and the chuck sleeve.

In the work piece chuck of a manipulator of the invention, a stop edge is formed on the inner side wall at the inner end of the chuck sleeve and a stop shoulder is formed on the outer side at the inner end of the ejector pin to be pressed against the stop edge. When the stop shoulder at the inner end of the ejector pin is pressed against the stop edge on the inner side wall at the inner side of the chuck sleeve, the front end of the ejector pin extends by the longest distance relative to the front end of the chuck sleeve.

In the work piece chuck of a manipulator of the invention, the inner end of the ejector pin is threaded with a transition sleeve and a connection hole is formed on the transition sleeve to be connected with the power element mounted in the manipulator. The ejector pin is connected with the power element through the connection hole on the transition sleeve, and the power element could the block the inner cavity of the ejector pin at the inner end of the ejector pin in the meantime.

In the work piece chuck of a manipulator of the invention, the inner end of the chuck sleeve is threaded with a positioning cylinder, and the end of the positioning cylinder is provided with a flange to be connected with the manipulator. When the work piece chuck of a manipulator of the invention is in operation, the chuck sleeve could be fixedly connected with the front end of the manipulator by using the flange at the end of the positioning cylinder.

The work piece chuck of a manipulator of the invention has the following advantages over the prior art.

First, by using the work piece chuck of a manipulator of the invention, the front end of the chuck sleeve expands outward to engage the engagement part with the work piece when the ejector pin is pushed out of the chuck sleeve. The work piece chuck not only has a simple structure, but also is firmly connected with the work piece for which the work piece does not tend to fall off or translocate.

Second, by using the work piece chuck of a manipulator of the invention, three positioning protrusions at the front end of the ejector pin could be in cooperation with the inner bores of the work piece, and the chuck will not rotate relative to the work piece. Meanwhile, the ejector pin and the chuck sleeve are circumferentially fixed through the position limiter and position limiting groove, for which higher reliability is provided in operation.

Third, by using the work piece chuck of a manipulator of the invention, air could be provided into the work piece via the air outlets through the air exiting means on the ejector pin. As a result, the residuals within the work piece could be cleared, which provides higher use value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The embodiments of the invention will be described below and the technical solutions of the invention will be further illustrated in connection with the accompanying figures. However, the present invention shall not be limited to these embodiments.

First Embodiment

Figure 1:
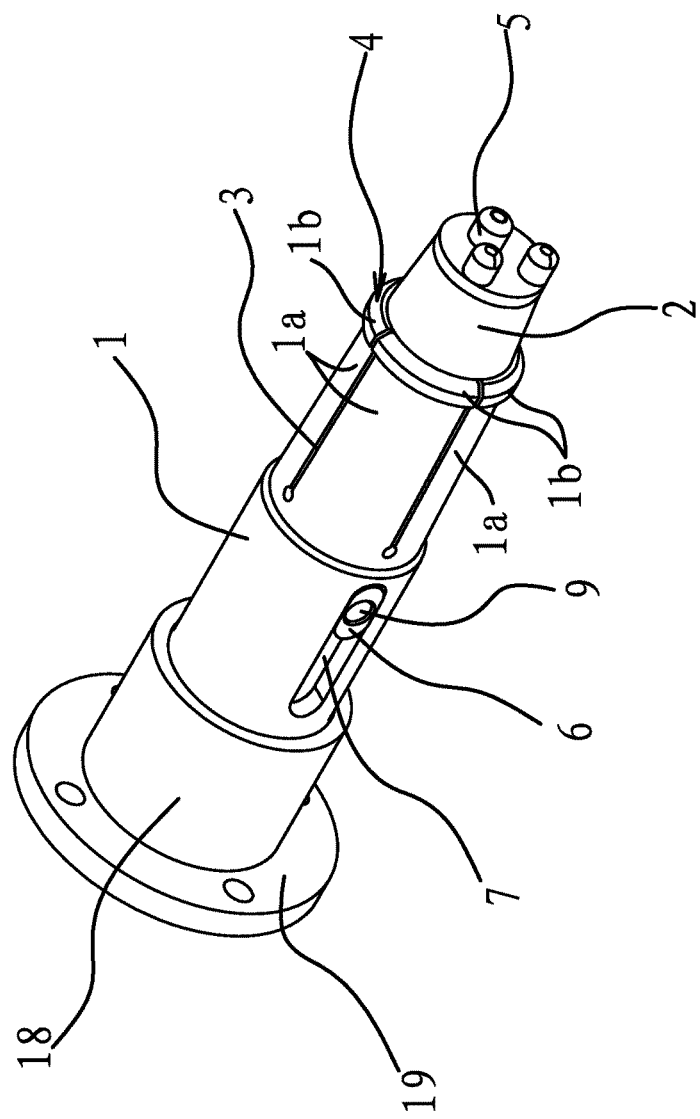
FIG. 1 is a stereogram of the work piece chuck of a manipulator according to the first embodiment.

As shown in FIG. 1, the chuck is provided at the front end of the manipulator, comprising a chuck sleeve and an ejector pin 2 set within the chuck sleeve 1. An elastic clamping element 1a is provided at the front end of the chuck sleeve 1. The ejector pin 2 could move between a first position and a second position along the axial direction of the chuck sleeve 1. When the ejector pin 2 is in the first position, the outer circumference of the ejector pin 2 extrudes the clamping element 1a to distort and expand outward to form an expansion state. When the ejector pin 2 is in the second position, the outer circumference of the ejector pin 2 is out of contact with the clamping element 1a to restore the clamping element 1a. The ejector pin 2 is in the second position in use and the chuck sleeve 1 is in a normal status and inserted into the inner bore of the work piece such as a water faucet. When the ejector pin 2 is moved into the first position, the clamping element 1a is in the expansion state to hold the work piece. When the ejector pin 2 is moved into the second position, the work piece is no longer held by the clamping element.

Figure 2:
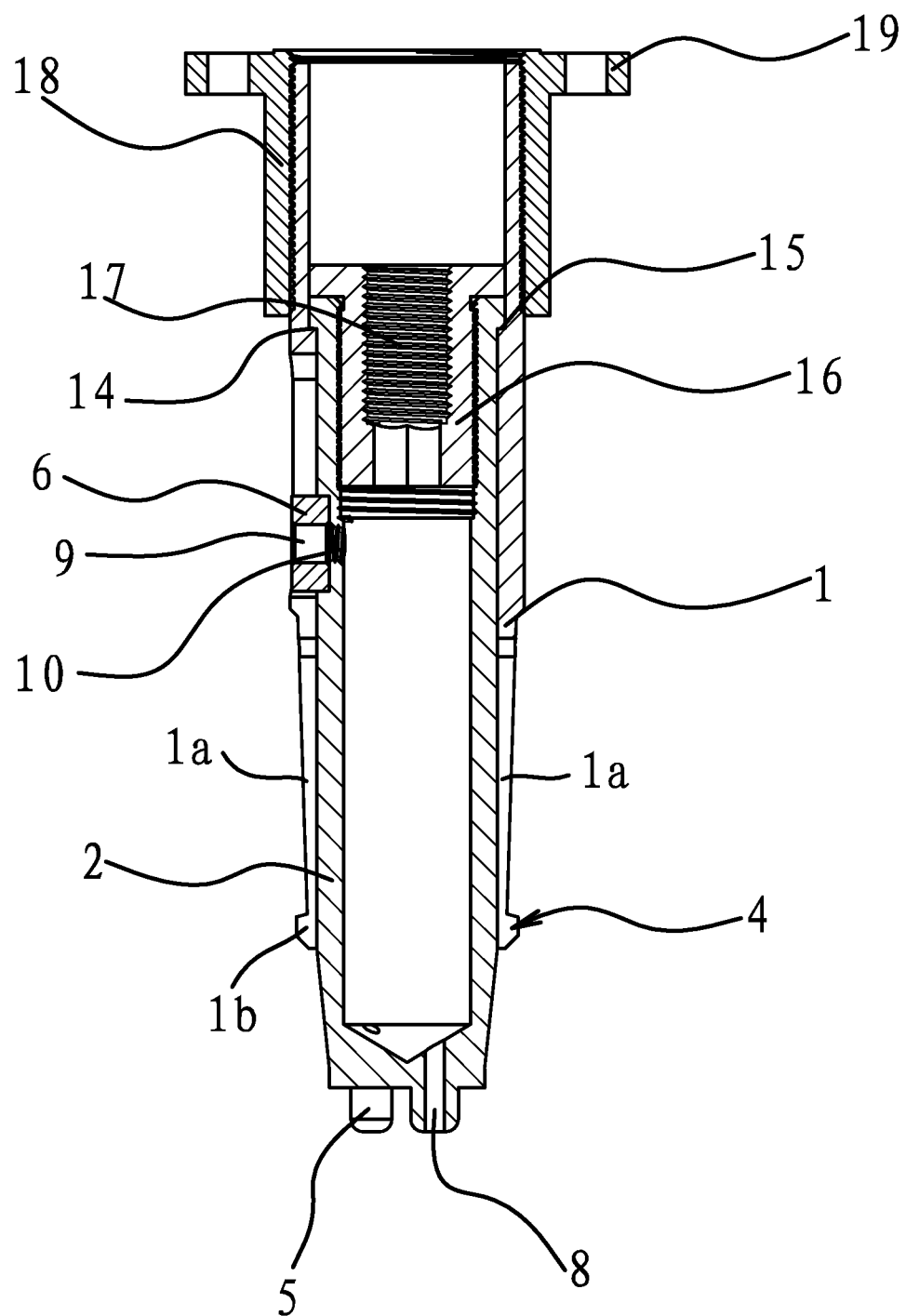
FIG. 2 is a section view of the work piece chuck of the manipulator according to the first embodiment.

Specifically, referring to FIGS. 1 and 2, the chuck sleeve 1 is cylindrical and the ejector pin 2 is columnar. A stop edge 14 is formed on the inner side wall at the inner end of the chuck sleeve 1. A stop shoulder 15 is formed on the outer circumference at the inner end of the ejector pin 2 to be pressed against the stop edge 14. The inner end of the chuck sleeve 1 is threaded with a positioning cylinder 18. The end of the positioning cylinder 18 is provided with a flange 19 to be connected with the manipulator. The inner end of the ejector pin 2 is threaded with a transition sleeve 16 on which a connection hole 17 is formed to be connected with the power element mounted in the manipulator. The front end of the ejector pin 2 could retract relative to the front end of the chuck sleeve 1 under the action of the power element.

Four clamping elements 1a are provided and arranged into an annular port which is formed by four indentations 3 at the front end of the chuck sleeve 1 evenly distributed along the axial direction of the chuck sleeve 1. An arc structure having an inner diameter larger than the width of the indentation 3 is provided at the bottom of the indentation 3 for increasing the elasticity of the clamping elements 1a. With reference to FIGS. 1 and 2, the clamping elements 1a are configured to be an arc plate-like structure and elastic. Such a structure easily forms an expansion structure and engagement parts 1b are formed on the outer circumference of the front end of the chuck sleeve 1 which can be engaged with the work piece. The engagement parts 1b project from the outer circumference of the clamping elements 1a. As such, the engagement parts 1b form an annular shoulder 4 on the outer circumference at the front end of the chuck sleeve 1. The front end of the chuck sleeve 1 and the front end of the ejector pin 2 are both conical. The taper angle of the front end of the ejector pin 2 is larger than that of the front end of the chuck sleeve 1 and the front end of the ejector pin 2 partly extends out of the front end of the chuck sleeve 1. By using the said configuration, the expansion displacement of the clamping element 1a could be controlled by the extension distance of the ejector pin 2. Not only can different clamping forces be selected as desired, but also the error and wear rate could be adjusted by the moving distance of the ejector pin when the ejector pin and the chuck sleeve wear.

The ejector pin 2 and the chuck sleeve 1 are circumferentially fixed. A position limiter 6 is disposed on the central side of the ejector pin 2 and a position limiting groove 7 is correspondingly disposed on the central side of the chuck sleeve 1. The position limiter 6 is located within the position limiting groove 7. The width of the position limiter 6 is identical to the width of the position limiting groove 7 and the length of the position limiting groove 7 is larger than that of the position limiter 6.

As shown in FIG. 2, three positioning protrusions 5 are formed on the front end of the ejector pin 2. The positioning protrusion 5 is provided with a perforative air outlet 8. The inner cavity of the ejector pin 2 is hollow and in communication with the air outlet 8. An air exiting means is provided on the ejector pin 2 for blowing air into the work piece through the air outlet 8. The air exiting means includes an air inlet 9 opened on the position limiter 6 and an air hole 10 opened on the inner side wall of the ejector pin 2 corresponding to the air inlet 9 on the position limiter 6.

The work piece chuck of the manipulator is fixed on the front end of the manipulator through the flange 19 on the positioning cylinder 18 threaded with the inner end of the chuck sleeve 1. The power element generally includes an air cylinder within the manipulator. The piston rod of the air cylinder extents from the positioning cylinder 18 into the inner end of the chuck sleeve 1 and is connected with the connection hole 17 on the transition sleeve 16 threaded with the inner end of the ejector pin 2. As such, the ejector pin 2 is driven by the piston rod of the air cylinder to move relative to the chuck sleeve 1.

The work piece is held by the work piece chuck of the manipulator in the following process. The chuck is brought by the manipulator to move onto the work piece. The air cylinder within the manipulator is driven into operation. The ejector pin 2 is brought by the piston rod of the air cylinder to move downward therewith and extend into the work piece. As both the front end of the ejector pin 2 and that of the chuck sleeve 1 are conical, and the taper angle of the front end of the ejector pin 2 is larger than that of the front end of the chuck sleeve 1, the front end of the ejector pin 2 extrudes the front end of the chuck sleeve 1 outward when the ejector pin 2 moves downward. As several indentations 3 are opened in the axial direction on the front end of the chuck sleeve 1, the front end of the chuck sleeve 1 will expand outward when it is extruded outwards. The front end of the chuck sleeve 1 continuously expands outward and is finally pressed against the inner side wall of the work piece as the ejector pin gradually moves downward. Meanwhile, the annular shoulder 4 disposed outside of the edge of the front end of the chuck sleeve 1 is engaged with the inner side wall of the work piece. When the work piece is a water facet and the ejector pin 2 is pressed against the valve core of the water faucet, the annular shoulder 4 disposed outside of the edge of the front end of the chuck sleeve 1 will be firmly engaged with the lowest end of the thread connection part on the inner side wall of the water faucet, which guarantees the firm connection of the chuck with the work piece.

Moreover, when the front end of the ejector pin 2 moves downward by the largest distance, three positioning protrusions 5 at the front end of the ejector pin 2 are inserted into the inner bores of the work piece. When the work piece is a water faucet, the positioning protrusions 5 are inserted into the water passage hole of the valve core of the water faucet. It is ensured that the chuck will not rotate relative to the work piece by the cooperation between the positioning protrusions 5 and the inner bores of the work piece, for which the work could be reliably held. Furthermore, as the ejector pin 2 and the chuck sleeve 1 are fixed in the circumferential direction, the ejector pin 2 and chuck sleeve 1 will not rotate relative to each other.

As a large amount of minute residuals are left within the work piece when the work piece is processed at the processing center, the air inlet 9 on the position limiter 6 on the side of the ejector pin 2 is communicated with an air supply before the work piece is held by the manipulator for polishing and finishing, and the inner cavity of the ejector pin 2 is supplied with air by the air supply. The positioning protrusion 5 has a perforative air outlet 8 in communication with the inner cavity of the ejector pin 2. As such, the air thus supplied could enter into the work piece through the air outlet 8. As a result, the work piece can be polished and finished while the residuals within the work piece can be cleared in the meantime. After the work piece is polished and finished, the air supply is separate from the air inlet 9, and then the air cylinder is controlled to restore the piston rod of the air cylinder to the initial state. The ejector pin 2 is driven by the piston rod 2 to retract into the chuck sleeve 1. The front end of the chuck sleeve 1 retracts and is separate from the work piece. The chuck eventually exits the work piece.

Second Embodiment

Figure 3:
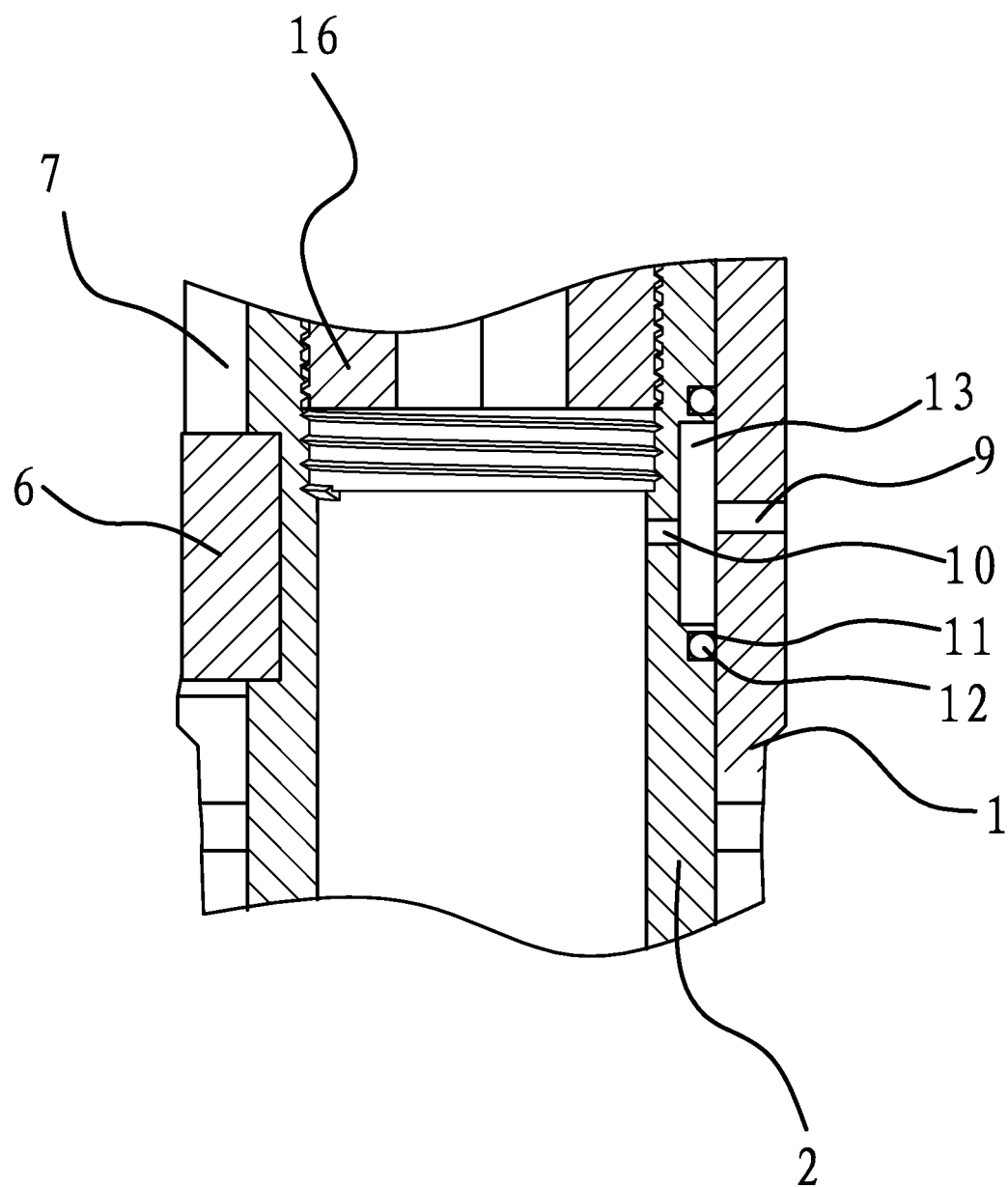
FIG. 3 is a partial section view of the air exiting means of the work piece chuck of the manipulator according to the second embodiment.

The structure and principle of this embodiment are substantially the same as those of the second embodiment except that, as shown in FIG. 3, two annular seal grooves 11 are opened on the side of the ejector pin 2 and an annular seal ring 12 is provided between the annular seal groove 11 and the inner side wall of the chuck sleeve 1. An annular groove 13 is further formed between two annular seal grooves 11 on the side of the ejector pin 2. The air exiting means includes an air hole 10 which is provided at the annular groove 13 and in communication with the inner cavity of the ejector pin 2 and an air inlet 9 which is disposed on the side of the chuck sleeve 1 and in communication with the air hole 10. The air inlet 9 is always located between two annular seal grooves 11 when the ejector pin 2 moves relative to the chuck sleeve 1 in the axial direction.

An air supply is connected with the air inlet 9 on the side of the chuck sleeve 1. While the ejector pin 2 is moved, the air enters into the inner cavity of the ejector pin 2 from the air supply through the air inlet 9 and the air hole 10, and eventually enters into the work piece via the air outlets 8 of the positioning protrusions 5 for cleaning. As the air inlet 9 is always located between two annular seal grooves 11 on the side of the ejector pin 2 when the ejector pin 2 moves, the air will not leak from the spacing between the ejector pin 2 and the chuck sleeve 1.

The embodiments described herein are merely illustrative of the spirit of the invention. It is obvious for those skilled in the art to make various modifications, supplements or alternatives to these embodiments without departing from the spirit of the invention or the scope as defined by the appended claims.

LIST OF REFERENCE NUMERALS

1 Chuck Sleeve
1a Clamping Element
1b Engagement Part
2 Ejector Pin
3 Indentation
4 Annular Shoulder
5 Positioning Protrusion
6 Position Limiter
7 Position Limiting Groove
8 Air Outlet
9 Air Inlet
10 Air Hole
11 Annular Seal Groove
12 Annular Seal Ring
13 Annular Groove
14 Stop Edge
15 Stop Shoulder
16 Transition Sleeve
17 Connection Hole
18 Positioning Cylinder
19 Flange

What is claimed is:

1. A work piece chuck of a manipulator, comprising:
a chuck sleeve (1);
an elastic clamping element (1a) provided at a front end of the chuck sleeve (1) capable of clamping a faucet;
an engagement part (1b) is provided at an end of an outer circumference of the clamping element (1a), the engagement part (1b) projecting from the outer circumference of the clamping element (1a);
an ejector pin (2) set within the chuck sleeve (1), the ejector pin (2) capable of moving between a first position and a second position along an axial direction of the chuck sleeve (1);
several cylindrical positioning protrusions (5) provided at a front end surface of the ejector pin (2), each positioning protrusion (5) inserting into a corresponding water passage hole on a valve core of the faucet;
a perforative air outlet (8) in each positioning protrusion (5);
a hollow inner cavity of the ejector pin (2), the hollow inner cavity being in communication with the air outlet (8);
an air exiting means provided on the ejector pin (2), the air exiting means capable of blowing air into the work piece through the air outlet (8);
a position limiter (6) disposed on a first side of a central circumference of the ejector pin (2);
an air inlet (9) on the air exiting means, the air inlet (9) opened on the position limiter (6); and
an air hole (10) on the air exiting means, the air hole (10) opened on an inner side wall of the ejector pin (2), the air hole (10) corresponding to the air inlet (9) on the position limiter (6);

wherein when the ejector pin (2) is in the first position, the ejector pin (2) moves outwardly and an outer circumference of the ejector pin (2) extrudes the clamping element (1a) to distort and expand outward to form an expansion state and each positioning protrusion (5) inserts into a water passage hole on the valve core; and wherein when the ejector pin (2) is in the second position, the ejector pin (2) retracts back into the outer circumference of the ejector pin (2) and the ejector pin (2) is out of contact with the clamping element (1a) to restore the clamping element (1a).

2. The work piece chuck as claimed in claim 1, wherein the clamping element (1a) is formed by linear indentations opened at the front end of the chuck sleeve (1) along the axial direction of the chuck sleeve (1).

3. The work piece chuck as claimed in claim 2, wherein the ejector pin (2) is fixedly connected with the chuck sleeve (1) in the circumferential direction, a rear end of the ejector pin (2) is connected with a power element, and the front end of the ejector pin (2) extends out of or retracts back into the front end of the chuck sleeve (1) under the action of the power element.

4. The work piece chuck as claimed in claim 3, wherein the engagement part (1b) forms an annular shoulder (4) on the outer circumference of the front end of the chuck sleeve (1).

5. The work piece chuck as claimed in claim 2, wherein the front end of the chuck sleeve (1) is conical.

6. The work piece chuck as claimed in claim 5, wherein the front end of the ejector pin (2) is also conical, the taper angle of the front end of the ejector pin (2) is larger than that of the front end of the chuck sleeve (1) and the front end of the ejector pin (2) partly extends out of the front end of the chuck sleeve (1).

7. The work piece chuck as claimed in claim 2, wherein a position limiting groove (7) is correspondingly disposed on a second side of a central circumference of the chuck sleeve (1), the position limiter (6) is located within the position limiting groove (7), the width of the position limiter (6) is identical to the width of the position limiting groove (7) and the length of the position limiting groove (7) is larger than that of the position limiter (6).

8. The work piece chuck as claimed in claim 7, wherein a stop edge (14) is formed on the inner side of a rear inner end of the chuck sleeve (1) and a stop shoulder (15) is formed on an outer side of a rear end of the ejector pin (2) to be pressed against the stop edge (14).

9. The work piece chuck as claimed in claim 8, wherein the inner end of the ejector pin (2) is threaded with a transition sleeve (16) and a connection hole (17) is formed on the transition sleeve (16) to be connected with the power element mounted in the manipulator.

10. The work piece chuck as claimed in claim 9, wherein the inner end of the chuck sleeve (1) is threaded with a positioning cylinder (18), and the end of the positioning cylinder (18) is provided with a flange (19) to be connected with the manipulator.

* * * * *